US011430996B2

(12) United States Patent
Yoo et al.

(10) Patent No.: US 11,430,996 B2
(45) Date of Patent: Aug. 30, 2022

(54) METHOD OF MANUFACTURING METAL SINGLE-ATOM CATALYSTS

(71) Applicant: KOREA INSTITUTE OF SCIENCE AND TECHNOLOGY, Seoul (KR)

(72) Inventors: Sung Jong Yoo, Seoul (KR); Injoon Jang, Seoul (KR); Hee-Young Park, Seoul (KR); So Young Lee, Seoul (KR); Hyun Seo Park, Seoul (KR); Jin Young Kim, Seoul (KR); Jong Hyun Jang, Seoul (KR); Hyoung-Juhn Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 146 days.

(21) Appl. No.: 16/802,206

(22) Filed: Feb. 26, 2020

(65) Prior Publication Data

US 2021/0159512 A1 May 27, 2021

(30) Foreign Application Priority Data

Nov. 26, 2019 (KR) .................. 10-2019-0153376

(51) Int. Cl.
*H01M 4/92* (2006.01)
*H01M 4/88* (2006.01)

(52) U.S. Cl.
CPC ......... *H01M 4/925* (2013.01); *H01M 4/8871* (2013.01)

(58) Field of Classification Search
CPC ....... Y02E 60/50; H01M 4/86; H01M 4/8867; H01M 4/8871; H01M 4/8882;
(Continued)

(56) References Cited

U.S. PATENT DOCUMENTS

2010/0222582 A1* 9/2010 Kern .................... C07D 251/60
544/201
2014/0221192 A1* 8/2014 Yoo ..................... H01M 4/9083
502/5

FOREIGN PATENT DOCUMENTS

CN 108342687 A * 7/2018
KR 1020170004248 A 1/2017
(Continued)

OTHER PUBLICATIONS

Tian et al., Fe-based catalysts for oxygen reduction in proton exchange membrane fuel cells with cyanamide as nitrogen precursor and/or pore filler, Jan. 21, 2011, Electrochimica Acta, vol. 56, pp. 3276-3285 (Year: 2011).*

(Continued)

*Primary Examiner* — Stefanie J Cohen
*Assistant Examiner* — Ritu S Shirali
(74) *Attorney, Agent, or Firm* — Rabin & Berdo, P.C.

(57) ABSTRACT

A method is disclosed for preparing a metal single-atom catalyst for a fuel cell including the steps of depositing metal single atoms to a nitrogen precursor powder, mixing the metal single atom-deposited nitrogen precursor powder with a carbonaceous support, and carrying out heat treatment. The step of depositing metal single atoms is carried out by sputtering, thermal evaporation, E-beam evaporation or atomic layer deposition. The method uses a relatively lower amount of chemical substances as compared to conventional methods, is eco-friendly, and can produce a single-atom catalyst at low cost. In addition, unlike conventional methods which are limited to certain metallic materials, the present method can be applied regardless of the type of metal.

9 Claims, 5 Drawing Sheets

(58) Field of Classification Search
CPC ...... H01M 4/9041; H01M 4/92; H01M 4/925; H01M 4/926; H01M 4/923; H01M 4/8803; B01J 37/347; B01J 21/18; B01J 23/40; B01J 23/48; B01J 37/0238; B01J 37/082; B01J 37/08
See application file for complete search history.

(56) References Cited

FOREIGN PATENT DOCUMENTS

| KR | 1020190049155 A | 5/2019 | | |
|---|---|---|---|---|
| WO | WO-2017042564 A1 | * | 3/2017 | .......... B01J 35/1038 |

OTHER PUBLICATIONS

Wang et al., Preparation, characterization and catalytic performance of single-atom catalysts, Sep. 5, 2017, Chinese Journal of Catalysis, vol. 38, pp. 1528-1539 (Year: 2017).*

Machine translation of CN 108342687 A originally published Jul. 2018 to Wen et al. (Year: 2018).*

Cabot: Black Pearls® 2000 carbon black [online], [retrieved on Nov. 23, 2021], Retrieved from the internet: < URL: https://www.fetc.com.tw/upload/files/BLACK-PEARLS-2000pdf.pdf > (Year: 2021).*

Zhao et al., Cascade anchoring strategy for general mass production of high-loading single-atomic metal-nitrogen catalysts, Mar. 20, 2019, Nature Communications, vol. 10, Article No. 1278, pp. 1-11 (Year: 2019).*

Saravanan et al., Pt nanoparticles embedded on reduced graphite oxide with excellent electrocatalytic properties, May 28, 2016, Applied Surface Science, vol. 386, pp. 96-102 (Year: 2016).*

Westerhaus et al., Heterogenized cobalt oxide catalysts for nitroarene reduction by pyrolysis of molecularly defined complexes, May 12, 2013, Nature Chemistry, vol. 5, pp. 537-543 (Year: 2013).*

Yamazaki et al., Atomic Structure and Local Electronic States of Single Pt Atoms Dispersed on Graphene, 2018, J. Phys. Chem. C, vol. 122, pp. 27292-27300 (Year: 2018).*

Hee-Young Park et al., "Green synthesis of carbon-supported nanoparticle catalysts by physical vapor deposition on soluble powder substrates", Scientific Reports, 5:14245, Sep. 18 2015, pp. 1-7.

* cited by examiner

METHOD OF MANUFACTURING METAL SINGLE-ATOM CATALYSTS

CROSS-REFERENCE TO RELATED APPLICATIONS

This application claims, under 35 U.S.C. § 119, the priority of Korean Patent Application No. 10-2019-0153376 filed on Nov. 26, 2019 in the Korean Intellectual Property Office, the disclosure of which is incorporated herein by reference in its entirety.

TECHNICAL FIELD

The following disclosure relates to a method for preparing a metal single-atom catalyst for a fuel cell.

BACKGROUND

Recently, synthesis of various types of single-atom catalysts has been reported. Such single-atom catalysts have been given much attention, since the atoms totally participate in reaction to cause a significant increase in reactivity per unit weight. Single-atom catalysts are materials useful for energy conversion and chemical modification by virtue of their catalytic properties resulting from their optimized atom utilization and unique quantum effect.

In general, methods for increasing the density and/or specific activity of active spots are used in order to improve the performance of a catalyst system. Therefore, a single-atom catalyst is one of the spotlighted catalyst systems, since it facilitates establishment of strategy for improving the performance of a catalyst system by virtue of maximum atom efficiency, unsaturated active spots and well-defined reaction mechanism.

Meanwhile, synthesis of a metal single-atom catalyst has been conducted in significantly limited conditions of metal types and synthetic processes due to the instability of a single atom itself caused by high surface energy and low coordination number of a single atom. In addition, since most synthetic processes proposed to date are based on synthesis using chemical substances, there are problem in that they require complicated processes and high cost and are harmful to the environment. Particularly, such problems severely hinder further studies about potential application fields in the industrial scale.

Particularly, when using a nitrogen-doped carbon support as a support for metal single atoms in order to improve the performance of a single-atom catalyst, it is possible to improve selectivity and activity to various electrochemical reactions. However, in this case, the manufacturing process becomes more complicated undesirably.

Therefore, there is a need for development of a method for preparing a metal single-atom catalyst based on a simple and eco-friendly process, while using a nitrogen-doped carbon support in order to improve the performance of the catalyst.

REFERENCES

Non-Patent Documents (Non-Patent Document 001) Green synthesis of carbon-supported nanoparticle catalysts by physical vapor deposition on soluble powder substrates, Sci Rep. 2015, 5, 14245.

SUMMARY

The present disclosure is designed to solve the problems of the related art, and an embodiment of the present disclosure is directed to providing a method for preparing a metal single-atom catalyst which is eco-friendly, uses a simple process and shows higher cost efficiency as compared to the methods according to the related art.

In one aspect of the present disclosure, there is provided a method for preparing a metal single-atom catalyst, including the steps of: (1) depositing metal single atoms to nitrogen precursor powder; and (2) mixing the metal single atom-deposited nitrogen precursor powder with a carbonaceous support and carrying out heat treatment.

The method for preparing a metal single-atom catalyst according to the present disclosure uses a relatively lower amount of chemical substances as compared to the methods according to the related art and thus is eco-friendly, uses no liquid through the whole process and avoids a need for additional steps for separating and/or washing the catalyst after its synthesis, thereby allowing simplification of the process, and can produce a single-atom catalyst at lower cost. In addition, unlike the conventional methods having a limitation in metallic materials, the method according to the present disclosure can be applied in common regardless of types of metals, and thus is significantly advantageous in that it can be applied widely to obtain various types of metal single-atom catalysts.

Further, in the method for preparing a metal single-atom catalyst according to the present disclosure, metal atoms totally participate in the reaction. Thus, the method can minimize the usage of metal to provide high cost-efficiency.

DETAILED DESCRIPTION OF EMBODIMENTS

Figure 1:
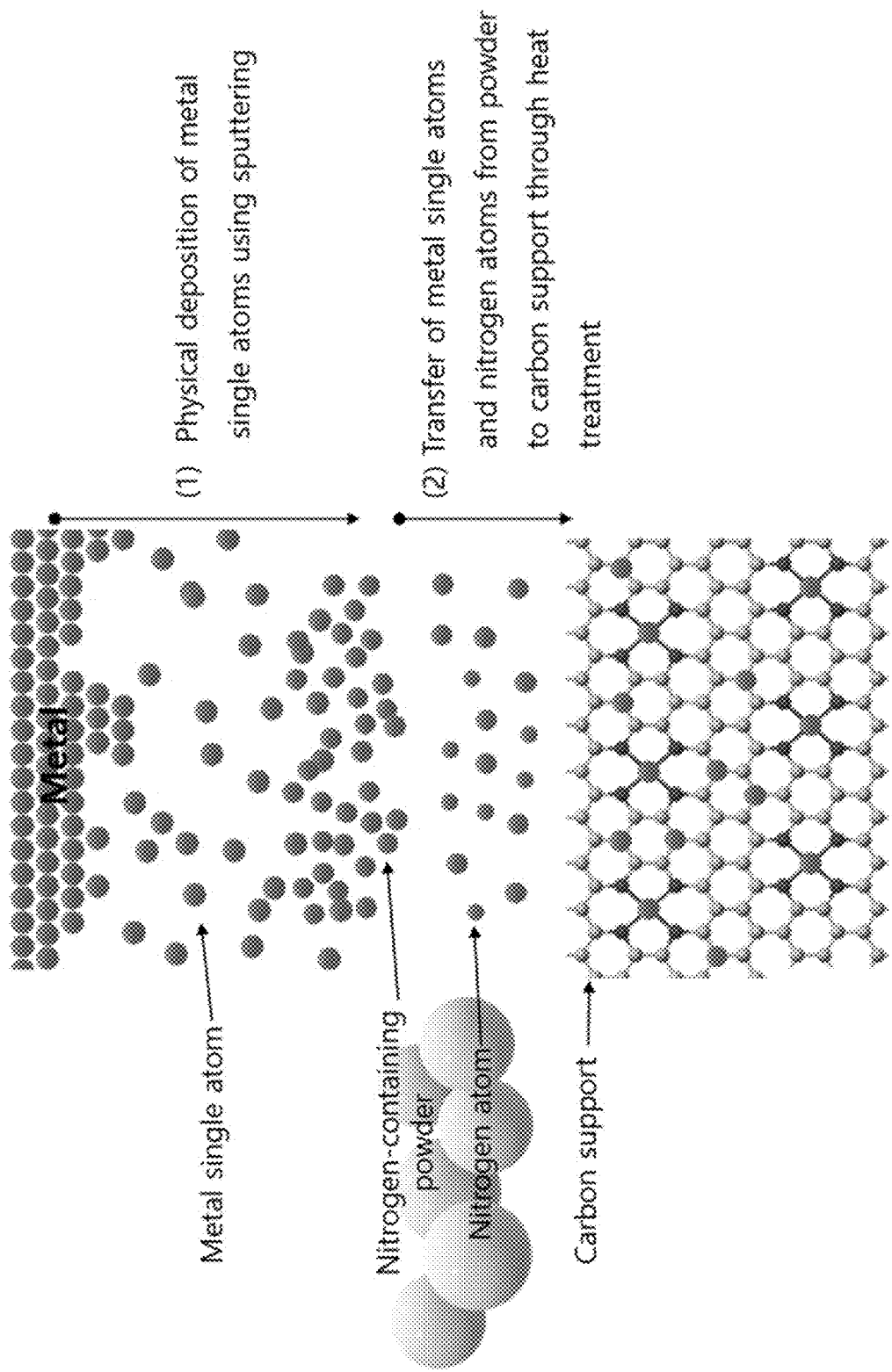
FIG. 1 is a schematic view illustrating the method for preparing a catalyst including nitrogen and metal single atoms supported on a carbonaceous support through a physical vapor deposition process according to an embodiment of the present disclosure.

Hereinafter, various aspects and embodiments of the present disclosure will be explained in more detail.

In one aspect of the present disclosure, there is provided a method for preparing a metal single-atom catalyst, including the steps of: (1) depositing metal single atoms to nitrogen precursor powder; and (2) mixing the metal single atom-deposited nitrogen precursor powder with a carbonaceous support and carrying out heat treatment.

Recently, a single-atom catalyst has been demonstrated as a material useful for energy conversion and chemical modification by virtue of its catalytic properties resulting from optimized atom utilization and unique quantum effect, and has been given many attentions by virtue of its maximized reactivity per unit weight.

The method for preparing a single-atom catalyst according to the present disclosure can produce a metal single-atom catalyst through a simple process which includes depositing metal single atoms to nitrogen precursor powder and transferring the metal single atoms from the nitrogen precursor powder to a support. Therefore, it is possible to solve the problems, including low yield and non-homogeneity of single atoms, according to the conventional methods for preparing a single-atom catalyst.

In addition, unlike the conventional methods for preparing a single-atom catalyst having a significant limitation in selection of metallic materials, the method according to the present disclosure is highly advantageous in that it can be applied regardless of types of metallic materials. Further, when preparing a single-atom catalyst according to the present disclosure, no expensive devices are required to provide high cost-efficiency, and usage of chemical substances is minimized to provide eco-friendly property.

According to an embodiment of the present disclosure, the method may further include a step of vacuum-drying the nitrogen precursor powder, before step (1).

In the method for preparing a metal single-atom catalyst according to the present disclosure, step (1) includes depositing metal single atoms to nitrogen precursor powder.

The nitrogen precursor in step (1) may be at least one selected from melamine, glucosamine, urea, thiourea, dicyandiamide and 2-cyanoquanidine, preferably melamine.

The metal in step (1) may be at least one selected from platinum, gold, palladium, cobalt, silver, rhodium, iridium, ruthenium, nickel, iron, copper, manganese, vanadium, chromium, molybdenum, yttrium, lanthanum, cerium, zirconium, titanium, tantalum and osmium.

In step (1), the deposition may be carried out by at least one selected from sputtering, thermal evaporation, E-beam evaporation and atomic layer deposition, preferably sputtering.

The sputtering may be carried out by using argon as sputtering gas under the conditions of a working pressure of 0.1-5 mTorr, preferably 0.1-2 mTorr, and more preferably 0.3-0.7 mTorr, and an electric power intensity of 1-100 W, preferably 1-20 W, and more preferably 5-15 W, for 1-24 hours, preferably 1-10 hours, and more preferably 1-5 hours.

The working pressure means the internal pressure of a sputtering chamber operated by maintaining the initial vacuum state of the internal part of the sputtering chamber, and then introducing inert gas thereto, and is maintained at a slightly higher level as compared to the initial pressure of vacuum.

The sputtering conditions may vary with materials to be deposited or deposition ratios. However, it is essentially required to maintain the above-defined ranges of sputtering working pressure and electric power intensity in order to deposit metal single atoms with high homogeneity and high density. The above-defined ranges of sputtering working pressure and electric power intensity are clearly differentiated from the currently used working pressure and electric power intensity. The sputtering conditions minimize impact energy between metal and argon plasma to reduce the size of separated metal from a nanoparticle scale to a single atom scale, and the metal single atoms and the nitrogen precursor form coordinate covalent bonding to control the mobility of metal single atoms adequately. In this manner, it is possible to deposit the metal single atoms homogeneously to the nitrogen precursor with high density.

Meanwhile, when the sputtering is carried out beyond the above-defined ranges, nanoparticles, i.e. a set of atoms, may be produced instead of metal single atoms from a metal target. Even when metal single atoms are produced, the single atoms show a rapid increase in mobility so that the single atoms may be deposited non-homogeneously or with low density, or aggregation of single atoms may occur undesirably.

The sputtering may be selected from direct-current (DC) magnetron sputtering or radio-frequency (RF) magnetron sputtering with no particular limitation. Preferably, the sputtering may be carried out by RF magnetron sputtering. In the case of DC magnetron sputtering, it has an advantage in that it is favorable to deposition of a larger amount of metal single atoms in a shorter time as compared to RF magnetron sputtering. However, it is required to control the mobility of atoms to a predetermined level in order to avoid aggregation of single atoms and to accomplish homogeneous deposition, and thus RF magnetron sputtering may be preferred in this context.

Figure 2:
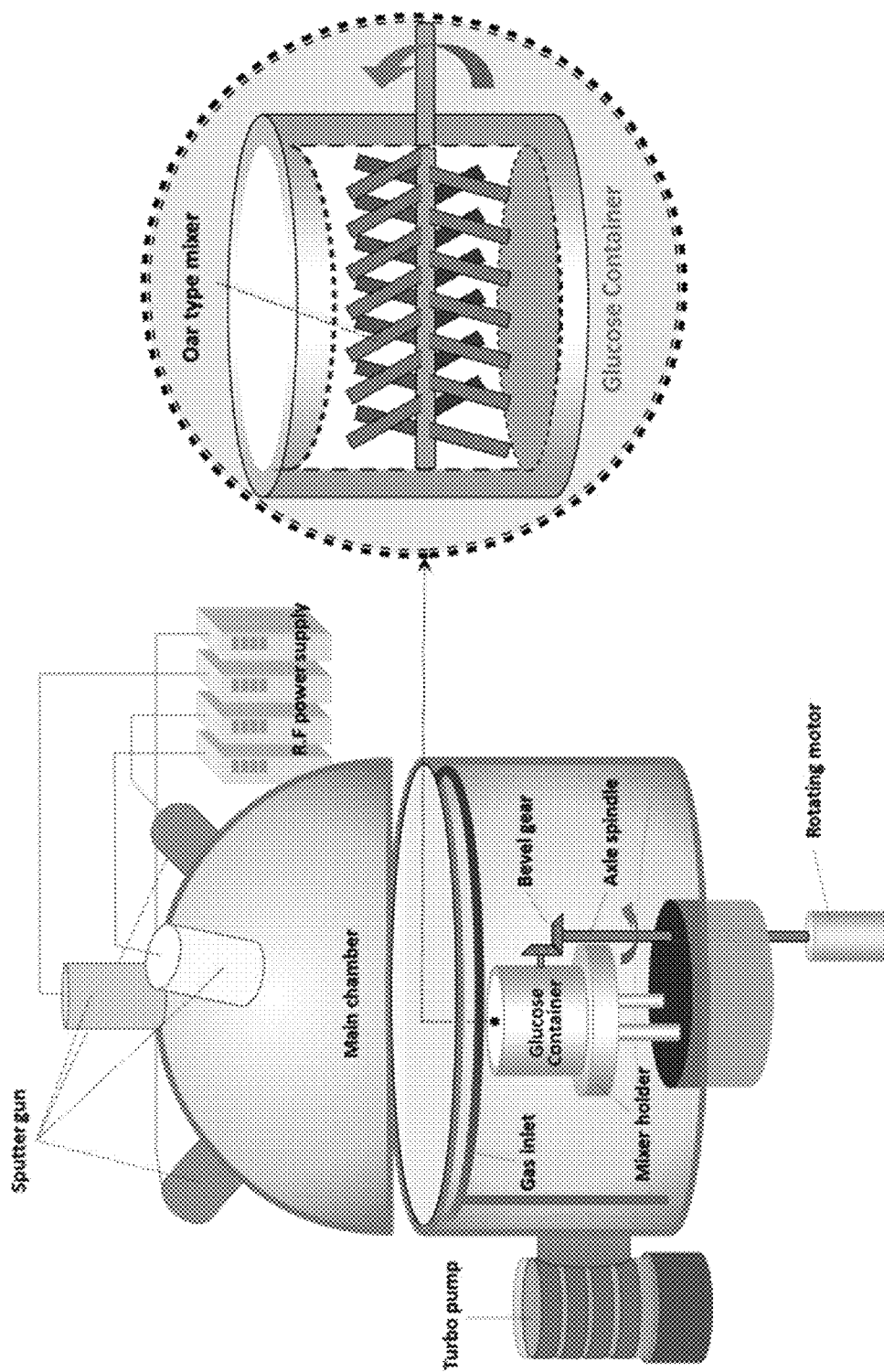
FIG. 2 is a schematic view illustrating a sputter system for deposition of metal single atoms to melamine powder according to an embodiment of the present disclosure.

The sputtering system used to carry out the sputtering may be one obtained by modifying the existing sputtering system in such a manner that an agitator may be disposed instead of a substrate at the site of the substrate. FIG. 2 is a schematic view illustrating the sputtering system having the above-mentioned characteristic according to an embodiment of the present disclosure. Referring to FIG. 2, the system is designed in such a manner that sputtering may be carried out while nitrogen precursor powder is introduced to and agitated in the agitator at the same time. Thus, the sputtering system allows homogeneous deposition of single metal atoms on the nitrogen precursor powder.

In the method for preparing a metal single-atom catalyst according to the present disclosure, step (2) includes mixing the metal single atom-deposited nitrogen precursor powder with a carbonaceous support and carrying out heat treatment.

The carbonaceous support in step (2) may be at least one selected from carbon nanotubes, carbon nanofibers, graphene, reduced graphene oxide (rGNO), carbon black, graphite, reduced graphite oxide (rGO) and carbon spheres.

In step (2), the mixing may be carried out at a weight ratio of the metal single atom-deposited nitrogen precursor powder to the carbonaceous support of 100-500:1, preferably 200-300:1.

In step (2), the heat treatment may be carried out under at least one gaseous atmosphere selected from the group consisting of argon, nitrogen, ammonia, hydrogen and helium, or under vacuum, at 400-1000° C., preferably 700-900° C., for 0.5-4 hours, preferably 1-3 hours.

When the above-defined heat treatment conditions are satisfied, it is shown that metal single atoms can be supported homogeneously even in a significantly large amount within a discernable error as determined by a transmission electron microscope.

After completing the heat treatment within the above-defined conditions, the metal single atoms and nitrogen atoms are transferred to the adjacent carbon support, while the nitrogen precursor powder disappears after thermal decomposition, thereby providing a catalyst including the nitrogen-doped carbonaceous support in which the metal single atoms are supported homogeneously. In other words, the metal single atoms are supported in the carbon support and the carbon support is doped with nitrogen at the same time through the heat treatment.

After the completion of the heat treatment, the metal single-atom catalyst may be used immediately without any further treatment such as a catalyst separation process, a washing process, or the like.

Therefore, the method for preparing a metal single-atom catalyst as described above includes a simple and easy process and shows high cost-efficiency.

The metal single-atom catalyst obtained from the method according to the present disclosure may be at least one selected from a catalyst for oxygen reduction, catalyst for hydrogen generation, catalyst for carbon dioxide reduction, catalyst for oxygen generation, catalyst for hydrogen oxidation, catalyst for ammonia reduction and a catalyst for a fuel cell electrode.

The single atoms in the metal single-atom catalyst may have an average size of 0.1-0.3 nm.

Meanwhile, although it is not described clearly in the following examples, or the like, each of the electrodes, including each of the metal single-atom catalysts obtained by modifying the type of metal, type of nitrogen precursor, type of carbonaceous support, sputtering conditions, heat treatment conditions, etc., in the method for preparing a metal single-atom catalyst according to the present disclosure, was observed for the surface and section of each catalyst by using a scanning electron microscope (SEM) to determine the metal single atom distribution homogeneity, and was subjected to oxygen reduction 500 times to determine the durability.

As a result, unlike the other conditions and the other numeral ranges, it is shown that when the following conditions are totally satisfied, the initial voltage is the same (1.70-1.71V) at the same current (10 mA/cm$^2$) within the error range of the instrument used for determination, as compared to the voltage after carrying out oxygen reduction 500 times; the metal single atoms are distributed homogeneously in the carbon support of the catalyst without aggregation; and no loss of the metal single atoms supported in the carbonaceous support is observed even after carrying out oxygen reduction 500 times to provide excellent durability: ① The nitrogen precursor is melamine, ② the metal is platinum, ③ the deposition is carried out through sputtering, ④ the sputtering gas is argon and is carried out under a working pressure of 0.1-2 mTorr with an electric power intensity of 1-20 W for 1-5 hours, ⑤ the carbonaceous support is reduced graphite oxide (rGO), ⑥ the mixing is carried out at a weight ratio of the metal single atom-deposited nitrogen precursor powder:carbonaceous support of 200-300:1, ⑦ the heat treatment is carried out under argon gas atmosphere at 700-900° C. for 1-3 hours, and ⑧ the single atoms in the metal single-atom catalyst have an average size of 0.1-3 nm.

However, it is shown that when any one of the above-mentioned conditions is not satisfied, the metal single atoms in the catalyst may be partially aggregated, loss of the metal single atoms on the carbonaceous support may occur to cause degradation of durability, and corrosion of the metal structure surface may occur when the catalyst is subjected to high-temperature atmosphere, or acidic or alkaline atmosphere for a long time, leading to separation of a coating layer and catalyst to cause degradation of catalytic activity.

In another aspect of the present disclosure, there is provided a fuel cell which includes an electrode including the metal single-atom catalyst, and an electrolyte membrane.

Since the fuel cell uses the metal single-atom catalyst according to the present disclosure, it maintains the activity of its electrode catalyst even when it is operated for a long time or at high temperature.

The fuel cell may be a fuel cell for mobile applications and household applications, including notebook computers, portable electronic instruments, vehicles, buses, or the like.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples, and the changes and modifications are also within the scope of the present disclosure as defined in the following claims.

EXAMPLES

Example. Preparation of Metal Single-Atom Catalyst (1) Preparation of Platinum Single Atom-Deposited Melamine Powder Melamine powder was vacuum-dried at 70° C. under $10^{-2}$ Torr, 24 hours before the deposition, to remove water on the surface.

After introducing 40 g of the melamine powder from which water was removed to an agitator, the agitator was mounted to a sputter main chamber.

Next, a platinum (Pt) target was mounted to a radio-frequency (RF) magnetron sputtering gun, a vacuum state was formed by using a vacuum pump, and the initial vacuum state was retained at $10^{-6}$ Torr.

Then, a working pressure of 0.5 mTorr was generated for deposition by using argon (Ar) gas. After operating the agitator, platinum sputtering was carried out to deposit platinum single atoms on the surface of melamine powder. The platinum sputtering power (electric power intensity) was set to 10 W and the deposition was carried out for 3 hours.

(2) Preparation of Catalyst Including Platinum Single Atoms Supported in Nitrogen-Doped Carbonaceous Support (rGO)

First, 20 mg of a carbonaceous support (rGO; reduced graphite oxide) and 5 g of the platinum single atom-deposited melamine were introduced to a vial and agitated by using vibration of a vortex mixer for 1 minute so that they were mixed homogeneously.

The mixed powder was introduced to a zirconia crucible and heat treated by using a hot tube furnace at 800° C. for 2 hours. Herein, argon gas was allowed to flow through the furnace at a rate of 0.5 mL/min in order to prevent introduction of oxygen gas.

After completing the heat treatment, melamine disappeared through thermal decomposition and a catalyst including platinum single atoms supported in the nitrogen-doped carbonaceous support (rGO) was obtained.

Test Example 1. Transmission Electron Microscopy (TEM)

Transmission electron microscopy (TEM) was used to analyze the metal single-atom catalyst obtained from Example.

Figure 3A:
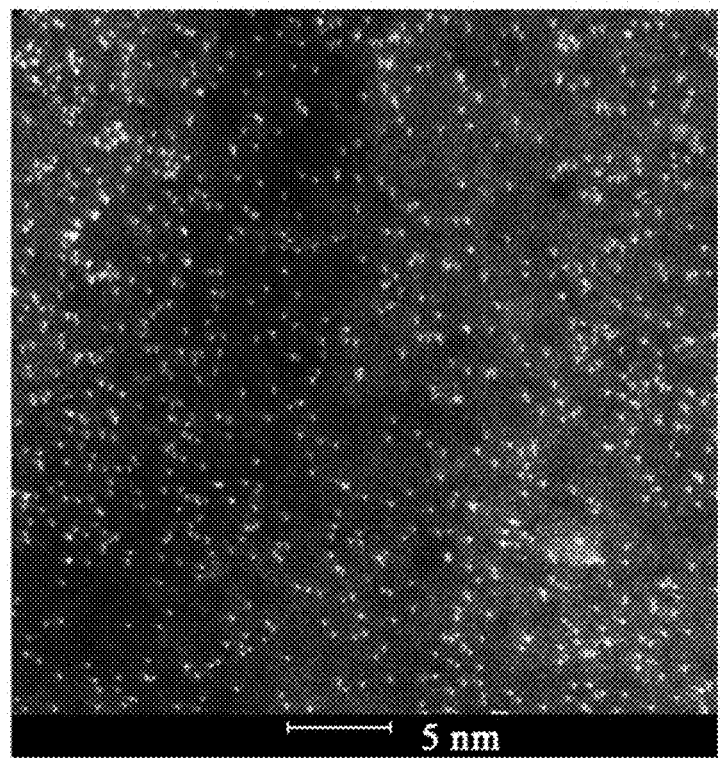
FIG. 3A shows a transmission electron microscopic (TEM) image of the metal single-atom catalyst according to an embodiment of the present disclosure.
Figure 3B:
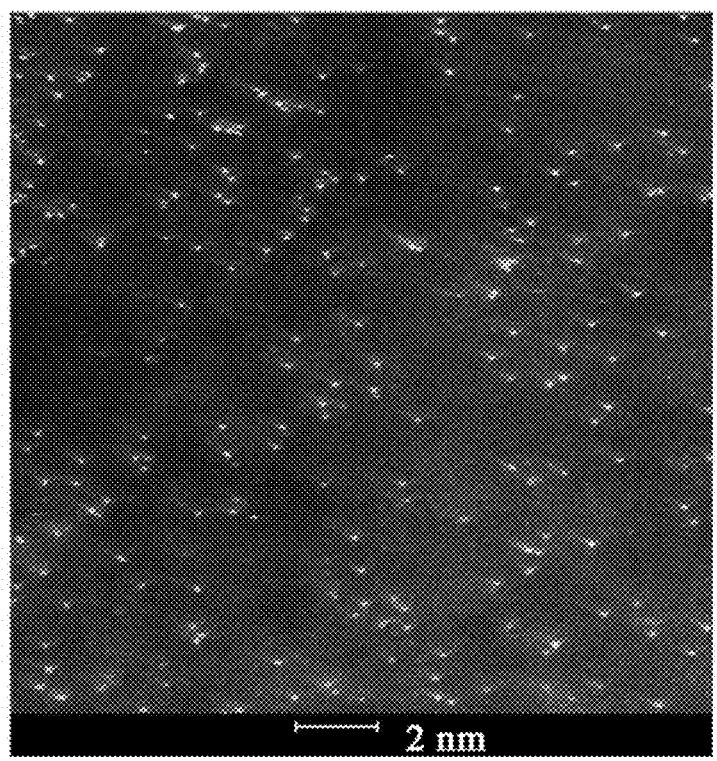
FIG. 3B is an image illustrating the results of TEM analysis of FIG. 3A, as observed at a higher magnification.

FIG. 3A shows a transmission electron microscopic (TEM) image of the metal single-atom catalyst according to an embodiment of the present disclosure, and FIG. 3B is an image illustrating the results of TEM analysis of FIG. 3A, as observed at a higher magnification.

In the image as shown in FIG. 3A, the white bright dots represent platinum single atoms. It can be seen that the platinum single atoms have a significantly small size. FIG. 3B illustrates the results of FIG. 3A analyzed at a higher magnification. In FIG. 3B, the white bright dots have a size of about 0.15-0.19 nm. As compared to the known size of platinum single atoms, 0.174 nm, the analyzed size is similar thereto. Thus, it can be seen that one white dot represents a platinum single atom.

Test Example 2. Energy Dispersive Spectroscopy (EDS)

Energy dispersive spectroscopy (EDS) was used to qualitatively analyze the elements forming the metal single-atom catalyst according to Example. The results are shown in FIG. 4.

Figure 4:
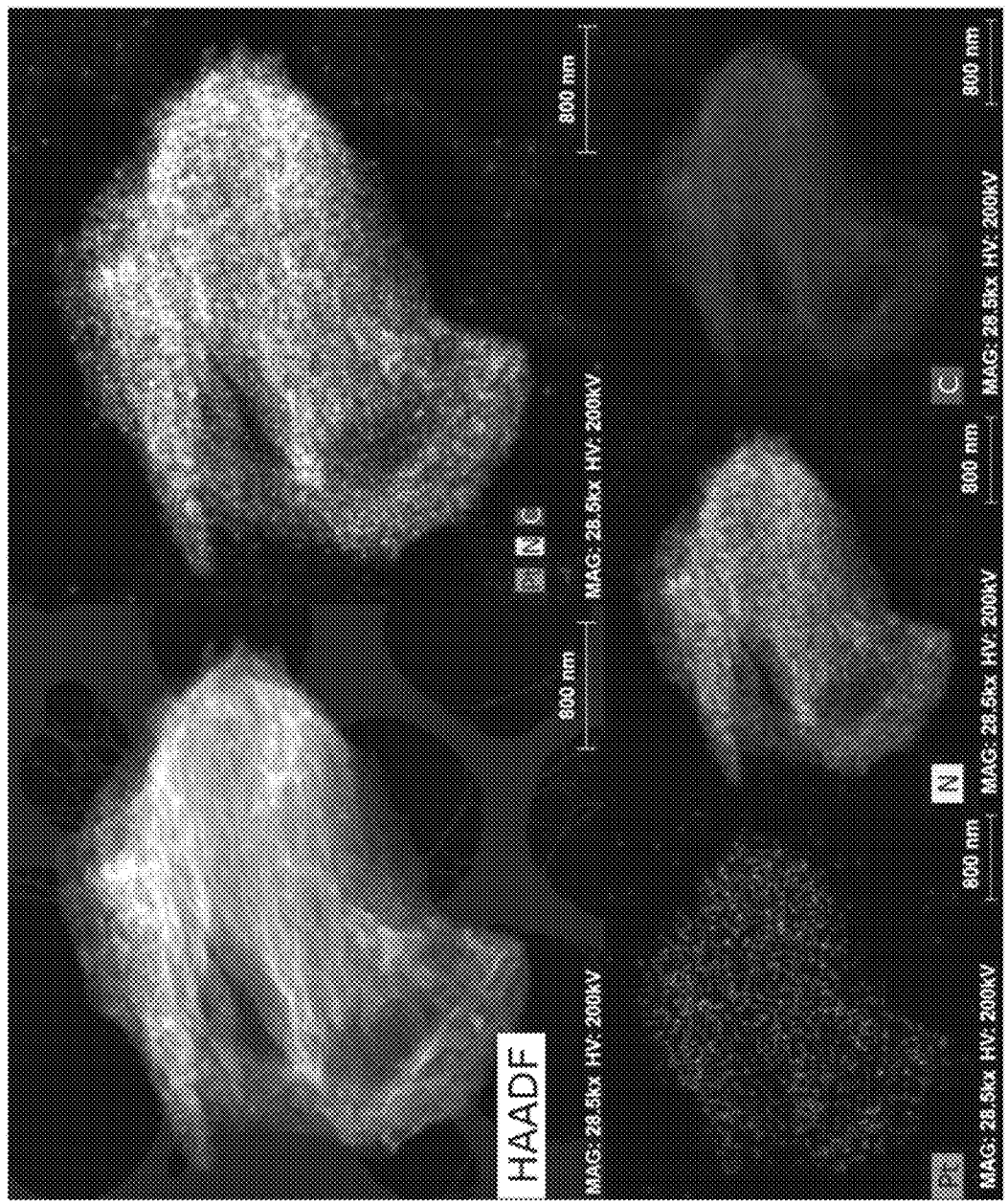
FIG. 4 is an image illustrating the results of elemental qualitative analysis of the metal single-atom catalyst according to an embodiment of the present disclosure, as determined by energy dispersive X-ray spectroscopy (EDS).

FIG. 4 is an image illustrating the results of elemental qualitative analysis of the metal single-atom catalyst according to an embodiment of the present disclosure, as determined by energy dispersive X-ray spectroscopy (EDS).

Referring to FIG. 4, it can be seen that platinum, nitrogen and carbon are distributed homogeneously in the catalyst according to an embodiment of the present disclosure.

In other words, it can be seen that nitrogen atoms are also doped to the carbonaceous support with no need for a separate step for nitrogen doping, when platinum single atoms are supported in the carbonaceous support (heat treatment step) during the preparation of the metal single-atom catalyst according to an embodiment of the present disclosure.

Test Example 3. X-Ray Diffractometry

Figure 5:
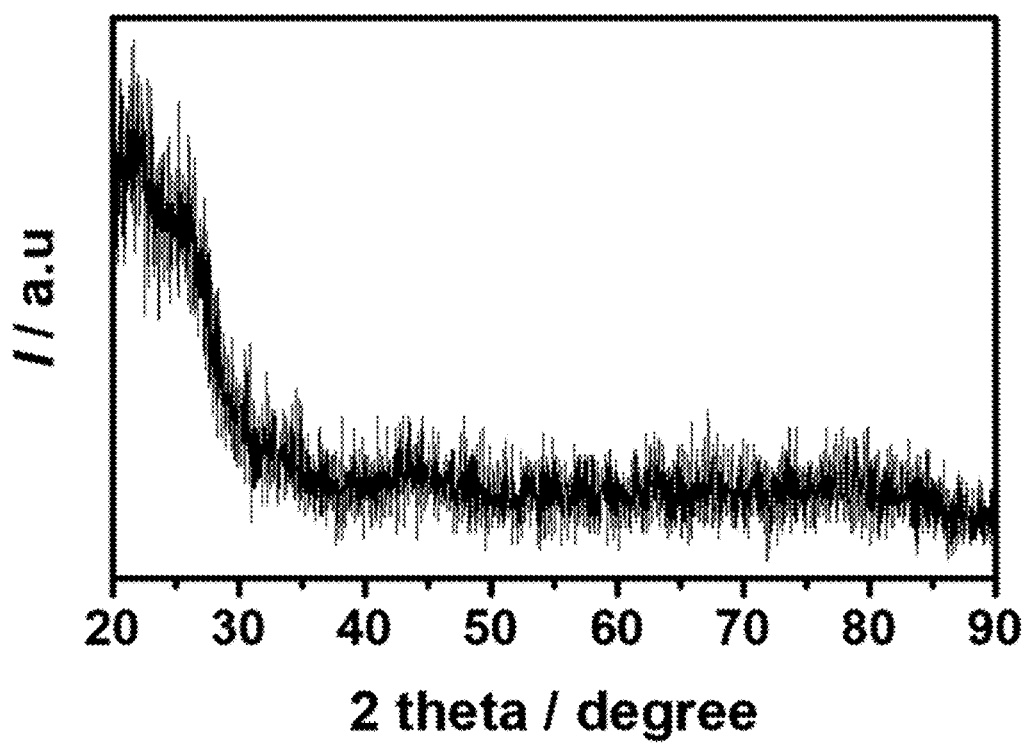
FIG. 5 is a graph illustrating the results of X-ray diffractometry of the metal single-atom catalyst according to an embodiment of the present disclosure.

X-ray diffractometry (XRD) was used to analyze the crystallinity of the metal single-atom catalyst according to Example. FIG. 5 is a graph illustrating the results of X-ray diffractometry of the metal single-atom catalyst according to an embodiment of the present disclosure.

Platinum has a face centered cubic (FCC) structure, and peaks appear at 37.76°, 46.24°, 67.45°, 81.27°, and 85.71° in X-ray diffractometry.

However, referring to FIG. 5, after the metal single-atom catalyst according to Example is analyzed by XRD, no crystalline structures related with platinum are observed, except the peak of carbon crystal at about 25°. This suggests that platinum exists as single atoms, and thus does not have any crystal structure.

In addition, while TEM is a significantly local analysis method, XRD shows the analysis results of the whole sample. Therefore, it can be seen that most of platinum present on the carbonaceous support exists as single atoms. It can be also seen that metal single atoms can be supported homogeneously in the carbonaceous support by the method according to the present disclosure.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a metal single-atom catalyst, comprising the steps of:
   (1) depositing metal single atoms on a nitrogen precursor powder by sputtering using argon as a sputtering gas under a working pressure of 0.1-5 mTorr and an electric power intensity of 1-20 W for 1-5 hours;
   (2) mixing the metal single atom-deposited nitrogen precursor powder formed in step (1) with a carbonaceous support to form a mixed powder;
   (3) carrying out heat treatment; and
   wherein the mixing of the metal single atom-deposited nitrogen precursor powder with a carbonaceous support at step (2) does not use liquid.

2. A method as in claim 1 wherein the working pressure is 0.1 to 2 mTorr.

3. A method as in claim 1 wherein the metal single atom is at least one selected from the group consisting of platinum, gold, palladium, cobalt, silver, rhodium, iridium, ruthenium, nickel, iron, copper, manganese, vanadium, chromium, molybdenum, yttrium, lanthanum, cerium, zirconium, titanium, tantalum and osmium.

4. A method as in claim 1 wherein the nitrogen precursor powder is at least one selected from the group consisting of melamine, glucosamine, urea, thiourea, dicyandiamide and 2-cyanoquanidine.

5. A method as in claim 1 wherein the carbonaceous support is at least one selected from the group consisting of carbon nanotubes, carbon nanofibers, graphene, reduced graphene oxide (rGNO), carbon black, graphite, reduced graphite oxide (rGO) and carbon spheres.

6. A method as in claim 1 wherein the mixing at step (2) is carried out at a weight ratio of the metal single atom-deposited nitrogen precursor powder to the carbonaceous support of 100-500:1.

7. A method as in claim 1 wherein the heat treatment in step (3) is carried out under vacuum, or under at least one gaseous atmosphere selected from the group consisting of argon, nitrogen, ammonia, hydrogen, and helium, at 400-1000° C. for 0.5-4 hours.

8. A method as in claim 1 wherein the metal single-atom catalyst is at least one selected from a catalyst for oxygen reduction, catalyst for hydrogen generation, catalyst for carbon dioxide reduction, catalyst for oxygen generation, catalyst for hydrogen oxidation, catalyst for ammonia reduction and a catalyst for a fuel cell electrode.

9. A method for preparing a metal single-atom catalyst according to claim 1, which further comprises a step of vacuum drying the nitrogen precursor powder before step (1); and
   wherein the nitrogen precursor powder is melamine;
   the metal single atoms are platinum;
   the deposition is carried out through sputtering;
   the sputtering is carried out at a working pressure of 0.1-2 mTorr;
   the carbonaceous support is reduced graphite oxide (rGO);
   the mixing is carried out at a weight ratio of the metal single atom-deposited nitrogen precursor powder to the carbonaceous support of 200-300:1;
   the heat treatment is carried out under an argon gas atmosphere at 700-900° C. for 1-3 hours;
   the metal single atoms in the metal single-atom catalyst have an average size of 0.1-0.3 nm; and
   wherein platinum, nitrogen, and carbon are distributed homogenously in the catalyst, and wherein X-ray diffraction of the catalyst reveals no crystalline structure related to platinum.

* * * * *